(12) United States Patent
Lengsfeld et al.

(10) Patent No.: US 8,083,976 B2
(45) Date of Patent: Dec. 27, 2011

(54) DEVICE AND METHOD

(75) Inventors: Hauke Lengsfeld, Helmste (DE); Hans Marquardt, Fredenbeck (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 12/548,032

(22) Filed: Aug. 26, 2009

(65) Prior Publication Data

US 2010/0059169 A1 Mar. 11, 2010

Related U.S. Application Data

(60) Provisional application No. 61/191,060, filed on Sep. 5, 2008.

(30) Foreign Application Priority Data

Sep. 5, 2008 (DE) .......................... 10 2008 041 832

(51) Int. Cl.
*B29C 70/18* (2006.01)
*B29C 53/48* (2006.01)

(52) U.S. Cl. ........ 264/112; 425/371; 425/112; 425/122; 425/348 R; 425/328; 156/199; 264/259

(58) Field of Classification Search ............... 425/363, 425/371, 112, 115, 405.1, 412, 193, 99, 122, 425/325, 328, 348 R, 395; 156/199; 264/112, 264/256

See application file for complete search history.

(56) References Cited

U.S. PATENT DOCUMENTS

| 1,625,649 | A | * | 4/1927 | Gottfried ................. 425/348 R |
| 2,214,191 | A | * | 9/1940 | Batchell et al. ........... 425/348 R |
| 2,644,779 | A | * | 7/1953 | Manning ....................... 156/167 |
| 2,937,404 | A | * | 5/1960 | Wilckens et al. ............. 425/110 |
| 2,949,639 | A | * | 8/1960 | Woodward ................... 264/280 |
| 3,490,973 | A | * | 1/1970 | Reinecke et al. ............. 156/156 |
| 4,360,329 | A | * | 11/1982 | Hatakeyama ................. 425/112 |
| 4,639,341 | A | * | 1/1987 | Hanamoto et al. .......... 264/40.1 |
| 4,836,765 | A | * | 6/1989 | Kornitzky et al. ............. 425/388 |
| 4,886,684 | A | | 12/1989 | Schnell et al. |
| 5,330,341 | A | * | 7/1994 | Kemerer et al. .............. 425/144 |
| 5,415,536 | A | * | 5/1995 | Ohno ........................... 425/121 |

(Continued)

FOREIGN PATENT DOCUMENTS

AT DE3727185 A1 2/1989

(Continued)

OTHER PUBLICATIONS

German Office Action for DE 10 2008 041 832.3 dated Apr. 20, 2009.

*Primary Examiner* — Joseph Del Sole
*Assistant Examiner* — Nahida Sultana
(74) *Attorney, Agent, or Firm* — Jenkins, Wilson, Taylor & Hunt, P.A.

(57) ABSTRACT

The present invention provides a device, in particular within the aeronautical and aerospace fields, comprising a first and second tool and guide means, which guide the first and second tools in such a way that they press a preliminary fabric arranged in a pressing zone of the device along a second axis as said fabric moves along a first axis through the pressing zone, said second axis being substantially transverse to the first axis, so as to form a consolidated preliminary fabric, the guide means guiding the first and second tools parallel to one another, in part, along the first axis in the pressing zone.

23 Claims, 6 Drawing Sheets

U.S. PATENT DOCUMENTS

| | | | |
|---|---|---|---|
| 5,433,905 A * | 7/1995 | Tisch | 264/83 |
| 5,449,698 A * | 9/1995 | Mabuchi et al. | 521/51 |
| 5,460,497 A * | 10/1995 | Vismara | 425/4 R |
| 5,489,201 A * | 2/1996 | Berns et al. | 425/233 |
| 5,592,874 A * | 1/1997 | Blauhut | 100/311 |
| 5,788,892 A * | 8/1998 | Graf | 264/120 |
| 5,925,302 A * | 7/1999 | Oono et al. | 264/267 |
| 6,045,738 A * | 4/2000 | Atake | 264/266 |
| 6,322,346 B1 * | 11/2001 | Hoffmann et al. | 425/371 |
| 6,413,069 B2 * | 7/2002 | Oono et al. | 425/112 |
| 6,599,456 B1 * | 7/2003 | von Haas | 264/120 |
| 6,799,958 B2 * | 10/2004 | Kato et al. | 425/112 |
| 7,306,444 B2 * | 12/2007 | Heinzen et al. | 425/89 |
| 7,794,224 B2 * | 9/2010 | Butteriss | 425/193 |
| 2004/0227265 A1 * | 11/2004 | Nishida et al. | 264/29.1 |
| 2005/0287238 A1 * | 12/2005 | Taylor | 425/371 |
| 2007/0052128 A1 * | 3/2007 | Taylor | 264/175 |
| 2007/0069414 A1 * | 3/2007 | Kott et al. | 264/119 |
| 2007/0119117 A1 * | 5/2007 | Gibbs | 52/698 |
| 2008/0237918 A1 * | 10/2008 | Meinecke | 264/175 |

FOREIGN PATENT DOCUMENTS

| | | |
|---|---|---|
| DE | 4406955 A1 | 9/1995 |
| JP | 01235605 A | 9/1989 |

* cited by examiner

DEVICE AND METHOD

CROSS-REFERENCE TO RELATED APPLICATIONS

This application claims the benefit of U.S. Provisional Application No. 61/191,060, filed Sep. 5, 2008, and German patent application No. 10 2008 041 832.3, filed Sep. 5, 2008, the entire enclosure of which are herein incorporated by reference.

FIELD OF THE INVENTION

The present invention relates to a device and a method, in particular within the aeronautical and aerospace fields.

Nowadays, stringer profiles are generally produced by the manual or partly automated laying of either a dry fibre material, with subsequent resin infusion, or a prepreg material over a mould core. The arrangement thus formed is wrapped in a suitable vacuum assembly in a further method step, to which a vacuum is applied. The application of the vacuum leads to consolidation of the fibre-resin material. In a further step the fibre-resin material is cured by subjecting the stringer profile to heat and/or pressure.

In the aforementioned method, the high level of manual work involved has proven to be disadvantageous. It may also lead to mistakes. Furthermore, the length of the stringer profiles produced using the aforementioned method is limited, since the length of the mould cores necessary for their production is limited owing to handling reasons.

SUMMARY OF THE INVENTION

The object of the present invention is therefore to provide an improved device and/or an improved method which avoids the aforementioned drawbacks.

This object is achieved by a device having the features of claim 1 and/or by a method having the features of claim 18.

A device, in particular within the aeronautical and aerospace fields, is accordingly provided. The device comprises a first and second tool as well as guide means. The guide means guide the first and second tool in such a way that they press a preliminary fabric arranged in a pressing zone of the device along a second axis as said fabric moves along a first axis through the pressing zone, said second axis being substantially transverse to the first axis, so as to form a consolidated preliminary fabric. The guide means thus guide the first and second tools substantially parallel to one another, at least in part, along the first axis in the pressing zone.

A method, in particular within the aeronautical and aerospace fields, is also provided. The method makes use, in particular, of the device according to the invention. In the method, a first and second tool are guided in such a way that they press a preliminary fabric arranged in a pressing zone of a device along a second axis as said fabric moves along a first axis through the pressing zone, said second axis being substantially transverse to the first axis, so as to form a consolidated preliminary fabric, the first and second tools being guided substantially parallel to one another, in part, in the pressing zone.

In the present case, "preliminary fabrics" are to be understood as a preferably flat preliminary fabrics and preferably also as deformed preliminary fabrics having a Ω-, Z-, U-, L- or T-shaped cross-section for example. The fabric may also comprise local reinforcements.

In the present case, "preliminary fabrics" are to be understood as fibre-woven fabrics, fibrous tissues and/or non-woven fabrics.

The fibre-woven fabrics, fibrous tissues and/or non-woven fabrics may be impregnated with a matrix, in particular a thermosetting or thermoplastic matrix. However, it may also be a dry fibre material which is only later impregnated with the aforementioned matrix. In this case, impregnation may be carried out in an injection or infusion process, or in another manner.

"Consolidated preliminary fabrics" are to be understood in the present case as preliminary fabrics in the pressed state.

The idea on which the present invention is based is that the preliminary fabrics are moved through the pressing zone in such a way that continuous production is enabled. Furthermore, the fact that the first and second tool may be guided in the pressing zone parallel to one another, in part, along the first axis enables the preliminary fabrics to be pressed for a relatively long period of time, the final profiled parts produced thus being of high quality.

The first and second tools may be configured so as to cooperate with the guide means in such a way that the guide means initially deform the flat preliminary fabrics in the pressing zone and then consolidate them or merely consolidate preliminary fabrics which have already been deformed. Deformation and consolidation are carried out successively by moving the first and second tools relative to one another along the second axis.

Advantageous embodiments and improvements of the invention can be found in the sub-claims.

According to a preferred development of the device according to the invention, a first chain which comprises a plurality of first chain links is provided, at least one of the first chain links carrying the first tool, and/or a second chain which comprises a plurality of second chain links is provided, at least one of the second chain links carrying the second tool. Chains offer the advantage that individual chain links can follow a linear path, at least in part. At the same time, it is also possible for the load to be transferred along the chain between the chain links. This makes is easy to guide the first and second tool parallel to one another, in part, along the first axis in the pressing zone using the guide means.

According to another preferred development of the device according to the invention, the first chain links carry a plurality of first tools and the second chain links carry a plurality of second tools, it being possible for the plurality of first and second tools to be arranged in respective rows within the pressing zone. This also makes it possible for the pressing zone to be configured so as to be relatively long, the preliminary fabric thus being well consolidated and the quality of the produced profiled parts thus being increased.

According to another preferred development of the device according to the invention, the two chains are each provided so as to revolve about at least two wheels arranged at a distance from one another. The centres of rotation of the wheels are preferably arranged on the vertices of an imaginary rectangle. The revolving configuration of the chains makes it possible to continuously press in the pressing zone in a simple manner.

According to another preferred development of the device according to the invention, the guide means are configured as two opposing rails, the first chain links or the at least one first tool being engaged with one rail, at least in the pressing zone, and the second chain links or the at least one second tool being engaged with the other rail, at least in the pressing zone. The guide means thus absorb the counter forces acting on the first and second tools during pressing. These counter forces act substantially along the second axis.

According to another preferred development, the rails extend substantially parallel to one another, at least in part. The rails preferably extend parallel to one another, at least in part, in a central region thereof. It is thus possible for the first and second tools to be guided in a simple manner parallel to one another, at least in part, along the first axis in the pressing zone.

According to another preferred development of the device according to the invention, the rails extend towards one another in an entry region of the pressing zone and away from one another in an exit region of the pressing zone. The first and second tools thus move towards one another in the entry region along the second axis and away from one another in the exit region along the second axis. The preliminary fabrics are drawn into the pressing zone at the entry region and the consolidated preliminary fabrics are released at the exit. The pressing force on the preliminary fabric is thus continuously increased in the entry region whilst the pressing force on the consolidated preliminary fabric is continuously reduced at the exit of the pressing zone.

According to another preferred development, the shape of at least one of the rails can be changed using first adjustment means. The pressing force acting on the preliminary fabric can thus be varied to almost any extent for optimum deformation or consolidation.

According to another preferred development of the device according to the invention, the at least one rail is configured so as to be able to bend in order to change its shape by way of the first adjustment means. This is an extremely simple solution. The rails may be made of a resilient steel for example. This resilient steel can thus be displaced easily along the second axis, for example by a few millimetres, by way of the first adjustment means which are configured as a hydraulic cylinder or as adjusting spindles for example.

According to another preferred development of the device according to the invention, the wheels and/or first adjustment means associated with the first chain is/are attached to a first bearing structure, and/or the wheels and/or first adjustment means associated with the second chain is/are attached to a second bearing structure, the first and second bearing structures being able to move independently of one another by way of second adjustment means. This therefore constitutes a further or alternative option for displacing the first and second tools relative to one another in the pressing zone. The second adjustment means thus preferably roughly adjust the distance between the first and second tools along the second axis in the pressing zone, for example when changing from a thick to a thin preliminary fabric. Fine adjustments of the distance between the first and second tools along the second axis in the pressing zone may, in contrast, preferably be made by the first adjustment means, for example if an increased pressing force is to be applied to the preliminary fabric owing to inadequate consolidation or if local reinforcements render a specific adjustment necessary.

According to another preferred development of the device according to the invention, the first and second tools define a gap in the pressing zone for receiving the preliminary fabric, said gap having a substantially constant, in particular Omega-, U- T- and/or L-shaped cross-section extending along the first axis. The cross-section of the gap thus corresponds to the cross-section of the preliminary fabric. As the first and second tools move through the pressing zone, the gap narrows so as to press the preliminary fabric to form the consolidated preliminary fabric, and then increases again so as to release the consolidated preliminary fabric.

According to another preferred development of the device according to the invention, the first and/or second tool comprise on at least one side of the gap sealing means for tightly clamping together a first and second vacuum film which surround the preliminary fabric, at least in part. The objective is to convey the preliminary fabric through the pressing zone and simultaneously subject it to a vacuum so as to achieve a high-quality component. This may, for example, be achieved by using the first and second vacuum films, which are simultaneously drawn into the pressing zone with the preliminary fabric. The sealing means prevent, at least in part, any leaks from the vacuum and any flow of air between the first and second vacuum films along a third axis perpendicular to the first and second axes.

According to another preferred development of the device according to the invention, a suction portion is provided which comprises a housing with a gap for guiding a portion of the first and second vacuum films there-through, and with a connection socket, to which a vacuum pump is connected. A vacuum can thus be established between the first and second vacuum films whilst they move through the pressing zone together with the preliminary fabric.

According to another preferred development of the device according to the invention, the suction portion comprises in its interior and along the gap at least one face and a counter face, in particular a pressure roller and counter pressure roller, between which the first and second vacuum films can be tightly clamped. A flow of leaking air can thus be reduced, the pumping power necessary for the vacuum pump also being reduced in turn.

According to another preferred development of the device according to the invention, a plurality of faces and counter faces are provided along the gap, which faces cooperate in pairs so as to tightly clamp the first and second vacuum films together, the pairs being distanced from one another along the gap in such a way that a ventilation portion formed between the first and second films may be arranged between two pairs when viewed transverse to the gap. A ventilation material, for example an air-permeable foam or a breather (common in autoclave technology), is arranged in the preferably strip-shaped ventilation portion, which material separates the first and second films in the ventilation portion in order to allow air to flow through. During operation of the suction portion, air with a low flow resistance is thus sucked out through the ventilation portion whilst the first and second vacuum films on either side of the ventilation portion are sealed by way of the faces and counter faces cooperating in pairs. This measure also enables the pumping power necessary for the vacuum pump to be reduced. The ventilation portion with the ventilation material preferably extends from the edge of the first and second vacuum films inside the housing of the suction portion, between the sealing means of the first and second tools and up to the preliminary fabric.

According to another preferred development of the device according to the invention, the suction portion comprises an inner matrix trap. Surplus matrix can be collected in the matrix trap if prepreg material is being used for the preliminary fabric. Any surplus matrix accrued can also be collected in the matrix trap if dry material is used, said material being infiltrated with the matrix either before or in the pressing zone.

According to another preferred development of the device according to the invention the first and/or second tool comprise at least one matrix feed channel for impregnating the preliminary fabric with a matrix. It is thus easy for dry fibre material to be infiltrated either in the pressing zone or therebefore.

According to another preferred development, the device comprises a heating device which is arranged in the pressing zone, at least in part, and by means of which heat can be transferred to said fabric in order to cure it. The matrix can thus be cured in the pressed state, which results in particularly good material properties. In addition, this can be achieved during continuous operation, i.e. whilst the preliminary fabric is being conveyed through the pressing zone.

According to another preferred development of the device according to the invention, deformation means, in particular rollers, are provided which deform the preliminary fabric and convey it towards the pressing zone. This makes it possible to convey substantially flat preliminary fabric to the device, said device then deforming the fabric in a first step to form preliminary fabric having a predetermined cross-section, for example a T-shaped cross-section, by way of the deformation means. The preliminary fabric thus formed is then pressed in the pressing zone, as described above.

According to another preferred development of the device according to the invention, the pressing zone is arranged upstream of a tunnel furnace for post-curing or annealing the profiled part. The quality of the component can thus be further improved.

According to another preferred development of the device according to the invention, the preliminary fabrics are configured as dry fabrics or prepreg materials. Dry fabrics of this type may, for example, be pressed in the pressing zone with the addition of binders to form profiled parts which are comparatively dimensionally stable. As already mentioned, they may also be infiltrated by a matrix either in or before the pressing zone. Prepreg materials offer the advantage that impregnation can occur in the pressing zone.

According to another preferred development of the device according to the invention, the preliminary fabric is configured as continuous material. Profiled parts of any length can thus advantageously be produced using the device according to the invention. Once the desired length has been reached, the profiled part formed can easily be cut using an appropriate saw.

According to another preferred development of the method according to the invention, the preliminary fabric is deformed in a deformation zone and is then conveyed to the pressing zone.

According to another preferred development of the method according to the invention, the preliminary fabric is inserted between a first and second vacuum film before being conveyed to the pressing zone.

According to another preferred development of the method according to the invention, a vacuum is created in a space formed between the first and second vacuum films, either before the pressing zone or in the pressing zone.

According to another preferred development of the method according to the invention, ventilation material is provided in ventilation portions between the first and second vacuum films at portions of their edge regions, relative to the first axis, the first and second vacuum films being guided through a suction portion either before or in the pressing zone and air being evacuated out of the space through the ventilation material, whilst portions of the first and second vacuum films arranged between the ventilation material are sealed in the suction portion during the evacuation process.

According to another preferred development, the preliminary fabric configured as a dry fabric is impregnated with a matrix either before or in the pressing zone.

According to another preferred development of the method according to the invention, heat is transferred to the consolidated profiled part in the pressing zone so as to cure it to form a profiled part.

According to another preferred development of the method according to the invention, the preliminary fabric is conveyed as continuous material.

According to another preferred development of the method according to the invention, the pressing process effected in the pressing zone is carried out continuously. The preliminary fabric is therefore not only pressed whilst it is moving through the pressing zone, but is also pressed continuously.

The aforementioned developments and advantages described in relation to the device according to the invention also apply to the method according to the invention.

BRIEF DESCRIPTION OF THE DRAWINGS

The invention will now be described in greater detail with reference to embodiments and the accompanying drawings, in which.

DETAILED DESCRIPTION OF THE DRAWINGS

Figure 1:
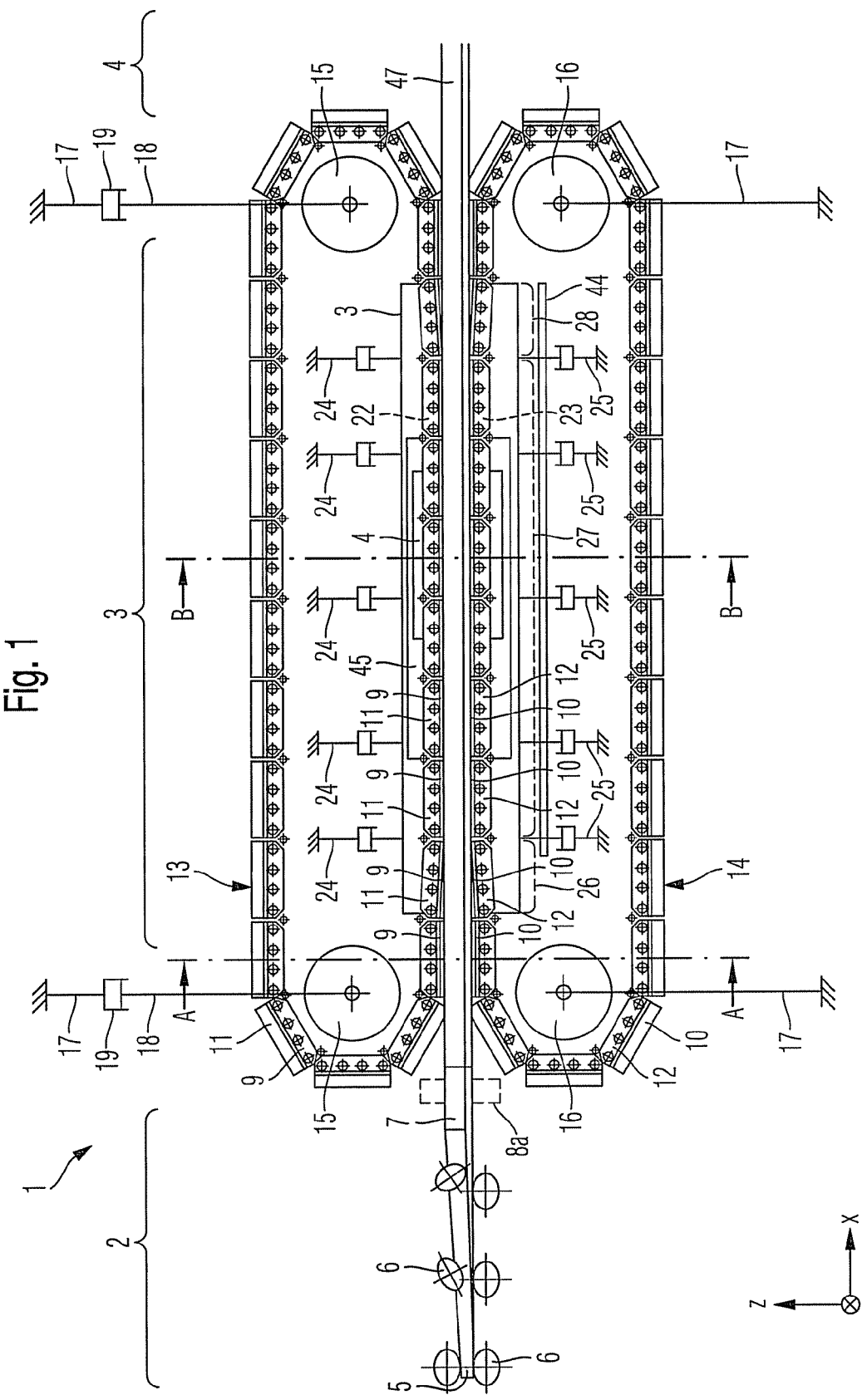
FIG. 1 shows a device according to one embodiment of the present invention.

In the figures, like reference numerals denote like or functionally similar parts, unless otherwise stated.

FIG. 1 is a side view of a device 1 according to an embodiment of the present invention.

The device 1 is preferably divided into a deformation zone 2, a pressing zone 3 and a discharge zone 4. In the deformation zone 2 a preliminary fabric 5 is deformed by rollers 6. The rollers 6 shape the preliminary fabric 5 so as to have any desired cross-section, for example an omega-shaped cross-section. The preliminary fabric 5 is preferably conveyed to the deformation zone 3 as flat, dry fibre material or prepreg material. The preliminary fabric 5 is preferably configured as continuous material and is stored on a spool (not shown in greater detail) for example. The deformed preliminary fabric is denoted by reference numeral 7.

Figure 2:
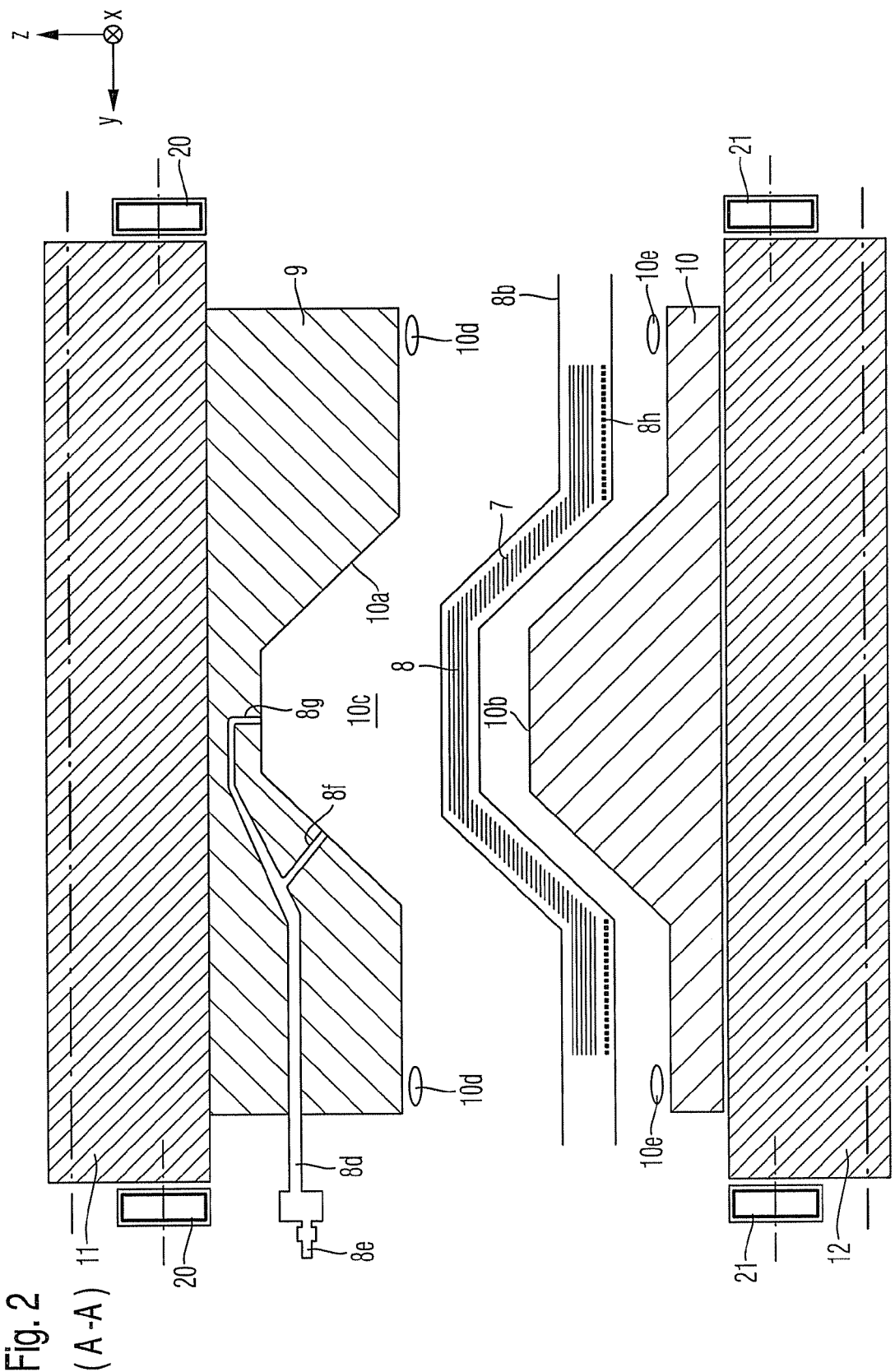
FIG. 2 is a sectional view along line A-A of FIG. 1.

FIG. 2 is a sectional view along line A-A of FIG. 1.

FIG. 2 shows the preliminary fabric 7 with its Ω-shaped cross-section 8, which is created by the rollers 6.

FIG. 1 also shows a means 8a of the device 1 which inserts the preliminary fabric 7 between two vacuum films 8b and 8c and conveys it to the pressing zone 3. A peel ply 8h may also be arranged between the preliminary fabric 7 and the film 8c.

After passing through the deformation zone 2, the preliminary fabric 7 inserted between the vacuum films 8b and 8c passes through the pressing zone 3. The pressing zone 3 is formed between a plurality of tools 9 and 10, as can be seen in FIG. 1. For reasons of clarity, only some of the tools are denoted with reference numerals in FIG. 1.

In the present case, a system of coordinates X, Y and Z is used. The axis along which the preliminary material 7 moves through the pressing zone 3 is labelled X. The axis along which the tools 9 and 10 are moved for applying the pressing force to the preliminary fabric 7 in a subsequent position (yet to be explained) is labelled Z. The axis substantially perpendicular to the X and Z axes is labelled Y.

As can be seen in FIG. 2, the tool 9 comprises a feed channel 8d for a matrix which, on the one hand, can be coupled to a matrix feed line (not shown) by way of a connection socket 8e in the form of a quick coupling and, on the other hand, branches off into channels 8f and 8g. By way of the device 1, a preliminary fabric 5 made of dry fibre material is processed in such a way that a matrix or even only a binder can be conveyed to it via the channels 8g and 8f. If a matrix or binder is to be conveyed, the films 8b and 8c are not provided as they would prevent impregnation. Alternatively, a separating film provided with defined holes may also be used.

As shown in FIG. 1, each of the tools 9 is supported on a respective chain link 11 and each of the tools 10 is supported on a respective chain link 12. Together, the chain links 11 form a closed chain 13 and the chain links 12 also form a closed chain 14. The chain 13 is tensioned between two wheels 15 and revolves thereabout. The chain 14 is also tensioned and revolves about two wheels 16 which are spaced apart. The wheels 15, 16 are arranged relative to one another in such a way that the chains 13 and 14 extend parallel to one another, at least in part, in the pressing zone 3. The wheels 16 are preferably rotatably mounted on and attached to a stationary bearing structure 17. In contrast, the wheels 15 are rotatably mounted on and attached to a bearing structure 18 which, for example, can be displaced relative to the bearing structure 17 by way of hydraulic cylinders 19 or adjusting spindles.

The tools 9 and 10 can preferably be removably connected to the chain links 11 and 12 in such a way that they can be replaced at any time. Tools 9, 10 having different shapes 10a and 10b for moulding the preliminary fabric 8 may thus also be provided, as shown in FIG. 2. The moulding shapes 10a and 10b define a gap 10c therebetween having a cross-section which remains constant along the X axis.

On either side of the gap 10c, the tools 9 and 10 each comprise seals 10d and 10e. These seal the film 8b against the film 8c in the pressing zone 3, as shown in FIG. 4, by pressing said films together locally.

Figure 4:
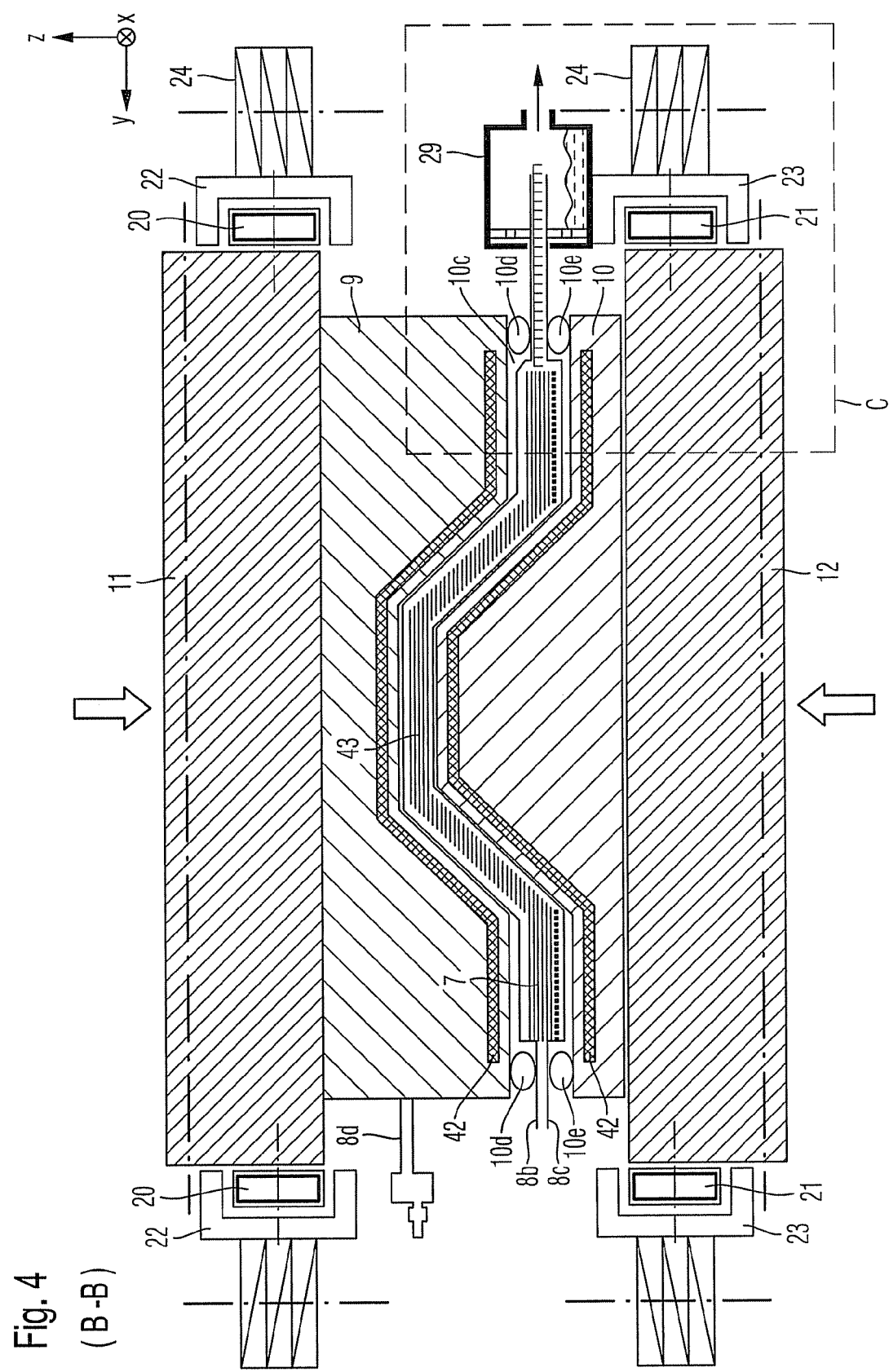
FIG. 4 is a sectional view along line B-B of FIG. 1.

FIG. 4 is a sectional view along line B-B of FIG. 1.

As shown in FIG. 4, the chain link 11 comprises lateral rollers 20 and the chain link 12 comprises lateral rollers 21. The rollers 20 are rotatably mounted on the chain link 11 and the rollers 21 are rotatably mounted on the chain link 12. In the pressing zone the rollers 20 are engaged with rails 22 and the rollers 21 are engaged with rails 23. The rails 22 and 23 are preferably formed with a U-shaped cross-section and receive the rollers 20, 21.

The rails 22 and 23 extend over the entire pressing zone 3. The rails 22 and 23 are preferably made of a resilient steel and are connected to adjustment means 24, 25, for example hydraulic cylinders or adjusting spindles, so as to be able to bend about the Y axis.

As can be seen in FIG. 1, the rails 22 and 23 extend towards the X axis in an entry region 26 of the pressing zone 3, substantially parallel to the X axis in a central region 27 of the pressing zone 3 which connects to the entry region 26, and away from the X axis in an exit region 28 which in turn is connected to the central region 27. Since the rails 22 and 23 in FIG. 1 are covered by the chain links 9 and 10, their reference numerals are shown with dashed reference lines. However, the shape of the rails 22, 23 can also be seen owing to the orientation of the individual chain links 11, 12, since the chain links 11, 12 are engaged with the rails 22, 23 and must therefore follow their shape.

Figure 3:
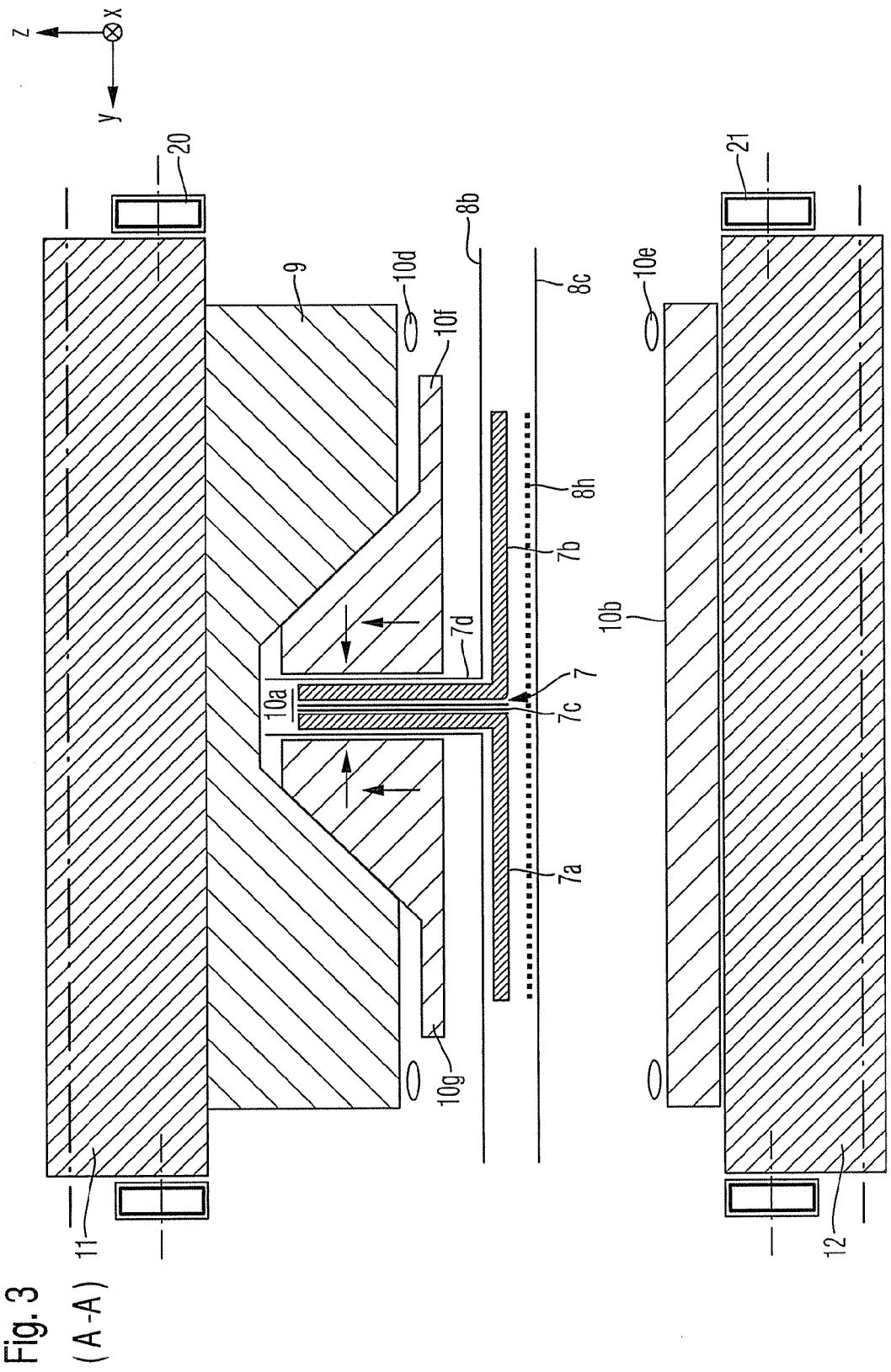
FIG. 3 is the sectional view along line A-A of FIG. 2 in accordance with another embodiment of the invention.

FIG. 3 shows the sectional view of FIG. 2 in accordance with a further embodiment of the present invention.

The tools 9, 10 in the embodiment according to FIG. 3 differ from those in the embodiment according to FIG. 2 as follows:

In this case, the aim is to consolidate a preliminary fabric 7 having a T-shaped cross-section in the pressing zone 3. The preliminary fabric 7 is composed of two L-shaped profiled parts 7a and 7b as well as a blade 7c arranged between the web 7d of said parts. Two pressing wedges 10f and 10g are displaceably mounted on the approximately trapezoidal moulding shape 10a of the tool 9 in such a way that they press the web 7d therebetween along the Y axis, as indicated by the horizontal arrow, when the pressing wedges 10f and 10g are moved along the Z axis, as indicated by the vertical arrows. The pressing wedges 10f and 10g may thus each comprise an engagement element (not shown) for example, which engages in a respective groove (not shown) in the tool 9. According to the present embodiment, the tool 10 has a flat moulding shape 10b.

The pressing process which takes place in the pressing zone 3 will now be described in greater detail with reference to FIGS. 1 and 4.

There are two ways, in particular, of moving the preliminary fabric 7 through the pressing zone 3. Firstly, it is possible to pull the preliminary fabric 7 through the pressing zone 3 using an appropriate pulling device (not shown) in the vicinity of the discharge zone 4.

Another option is to drive the wheels 15 and 16 of the chains 13 and 14 using electric motors for example. The chains 13 and 14 are thus preferably driven at approximately equal speed.

The following mode of operation applies to both of the above options of moving the preliminary fabric 7 through the pressing zone 3.

Merely a single chain link 11, 12 must be engaged in the pressing zone 3 with the respective associated rails 22, 23 for said links to be moved towards one another in the entry region 26 along the Z axis owing to the contour of the respective rail 22, 23, the preliminary fabric 7 being pressed along the Z axis, as indicated in FIG. 4 by the outlined arrows. The preliminary fabric 7 is thus consolidated, i.e. inter alia the matrix is distributed homogeneously within the fibre material or the binder is pressed into the dry fibres.

The seals 10b and 10e are also pressed solidly against one another when the preliminary fabric 7 is pressed, in such a way that a space which is closed, at least in part, is formed between the films 8b and 8c. At one end, the vacuum films 8b and 8c are preferably guided out of the gap 10c and extend along the Y axis until they are inside a suction portion 29. The function of the suction portion 29 will be described hereinafter in greater detail with reference to FIGS. 5 and 6.

Figure 5:
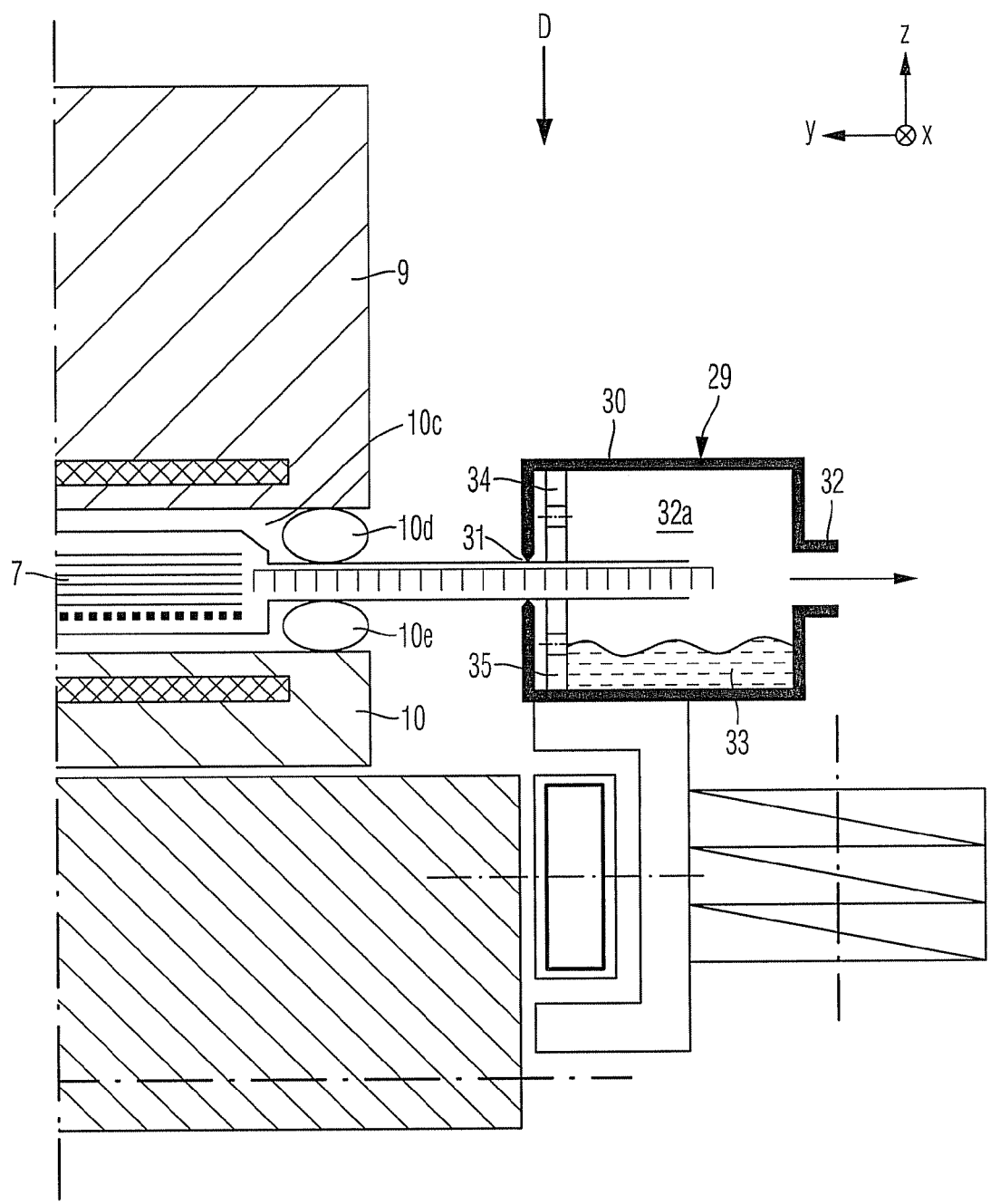
FIG. 5 is an enlarged view of the detail C of FIG. 4.
Figure 6:
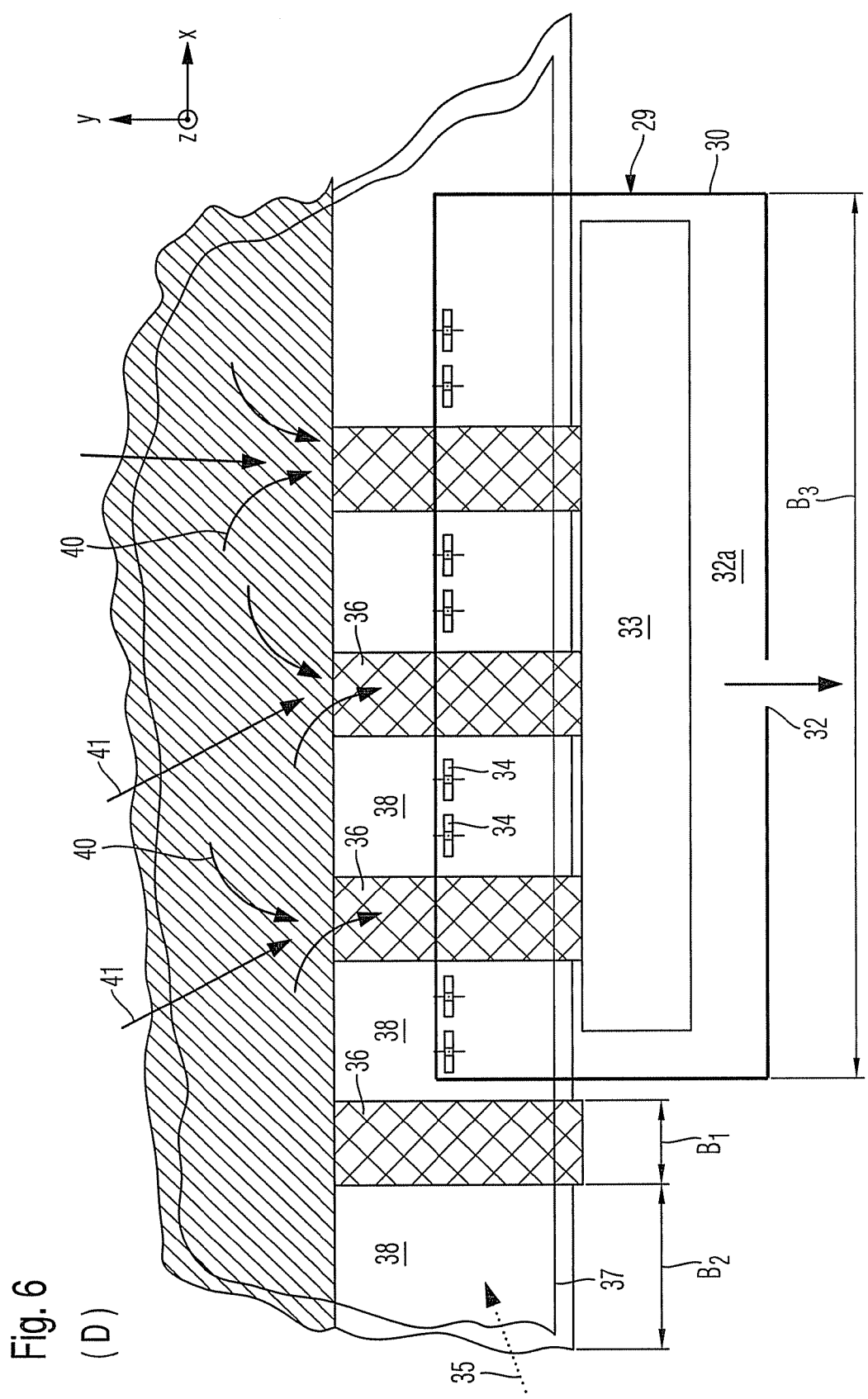
FIG. 6 is a plan view of a detail D of FIG. 5.

FIG. 5 is an enlarged view of the detail C of FIG. 4 and FIG. 6 is a plan view D of FIG. 5.

The suction portion 29 comprises a housing 30 which, at one end, has a gap 31 for guiding the films 8b and 8c through and, at the other end, is provided with a connection socket 32, at which a vacuum pump (not shown) applies a vacuum (indicated by an arrow) to the interior 32a of the housing. The suction portion 29 also comprises a collection tank 33 for any surplus matrix, also referred to as a resin trap. A plurality of rollers 34 and counter rollers 35 are arranged along the gap 31 along the X axis, which rollers press the film 8b and the film 8c together.

The films 8b and 8c are preferably provided with a plurality of strips of ventilation material 36 arranged at a distance from one another, which material extends, in each case, from an edge 37 of the films 8b, 8c along the Y axis until reaching the gap 10c. The ventilation material has a width B1 along the X axis. Regions 38 which are free from ventilation material 36 are provided between every two ventilation material strips 36, which regions have a width B2. The plurality of rollers 34, 35 is preferably arranged in such a way that they substantially continuously press the films 8b and 8c together in the regions 38 in an airtight manner.

The widths B1 and B2 are adjusted in such a way that the amount of air leaking out, indicated by the arrow 39 and sucked from outside the housing 30 between the films 8b and 8c, is as low as possible for a given width B3 of the suction portion. Owing to this low amount of leaking air 39, the power required for the vacuum pump can be kept comparatively low.

If a vacuum is applied at the connection socket 32 using a vacuum pump, air escapes from the space formed between the films 8b and 8c, as indicated by the arrow 40, in which space the preliminary fabric 7 is arranged. The air 40 is thus sucked up through the ventilation material 36, whilst the preliminary fabric 7 and the films 8b and 8c are moved along the X axis through the pressing zone. Any surplus matrix 41 is also sucked up through the ventilation material strips 36 and collected in the resin trap 33.

In the pressed state, a heating device 42 may transfer heat to the consolidated preliminary fabric 43. The heating device 42 may, for example, be configured as an ohmic heater which is integrated into the tools 9 and 10.

As shown in FIG. 1, a heating zone 44, in which the heating devices 42 are simultaneously connected in the respective tools 9, 10 so as to provide heat, extends for example over the entire central region 27 and the exit region 28 of the pressing zone 3. As shown in FIG. 1, a vacuum may be applied in a vacuum zone 45 inside the pressing zone 3, in particular within the central region 27. The matrix may be injected in a matrix injection zone 46 within the vacuum zone 45.

Once the heating zone 44 has been passed through, the consolidated preliminary fabric 43 is cured, at least in part, and forms a profiled part 47. In the exit region 28, the tools 9, 10 again move away from one another relative to the X axis and thus release the profiled part 47, which is subsequently conveyed to the discharge zone 4. A tunnel furnace for post-curing or annealing the profiled part 47 may also be provided in the discharge zone 4. The profiled part configured as a continuous profiled part 47 may also be cut into portions in the discharge zone 4 using a suitable cutting tool.

Although the present invention has been described with reference to preferred embodiments, it is not limited thereto and may be subject to a wide range of modifications.

Of course, it is also possible to use the invention within the field of vehicle manufacture.

LIST OF REFERENCE NUMERALS

1 Device
2 Deformation zone
3 Pressing zone
4 Discharge zone
5 Preliminary fabric
6 Roller
7 Preliminary fabric
7a L-shaped profiled part
7b L-shaped profiled part
7c Blade
7d Web
8 Cross-section
8a Means
8b Film
8c Film
8d Channel
8e Connection socket
8f Channel
8g Channel
8h Removal point
9 Tool
10 Tool
10a Shape
10b Shape
10c Gap
10d Seal
10e Seal
10f Pressing block
10g Pressing block
11 Chain link
12 Chain link
13 Chain
14 Chain
15 Wheel
16 Wheel
17 Bearing structure
18 Bearing structure
19 Hydraulic cylinder
20 Roller
21 Roller
22 Rail
23 Rail
24 Hydraulic cylinder
25 Hydraulic cylinder
26 Entry region
27 Central region
28 Exit region
29 Suction portion
30 Housing
31 Gap
32 Connection socket
32a Housing interior
33 Collection tank
34 Roller
35 Roller
36 Ventilation material
37 Edge
38 Free region
39 Leaking air
40 Air
41 Matrix
42 Heating device
43 Consolidated preliminary fabric
44 Heating zone
45 Vacuum zone
46 Matrix injection zone
47 Profiled part
B1 Width
B2 Width
B3 Width

The invention claimed is:

1. A device within the aeronautical and aerospace fields, comprising:
rollers configured to deform a preliminary fabric made of a dry fiber material provided at a deformation zone of the device;
a first and second tool, at least one of the first or second tool comprising at least one matrix feed channel for impregnating the deformed preliminary fabric with a matrix, the matrix feed channel being branched for an even distribution of the matrix; and
a guide that guides the first and second tools in such a way that the tools press the preliminary fabric deformed in the deformation zone and arranged in a pressing zone of the device along a second axis as the deformed preliminary fabric moves along a first axis through the pressing zone, said second axis being substantially transverse to the first axis, to form a consolidated preliminary fabric; wherein the guide guides the first and second tools substantially parallel to one another, in part, along the first axis in the pressing zone, and wherein in the pressing zone the first and second tools define a gap for receiving the deformed preliminary fabric, said gap having a substantially constant, in particular Ω-, U-, T-, and/or L-shaped cross-section extending along the first axis.

2. The device according to claim 1, wherein a first chain which comprises a plurality of first chain links is provided, at least one of the first chain links carrying the first tool, and/or a second chain which comprises a plurality of second chain links is provided, at least one of the second chain links carrying the second tool.

3. The device according to claim 2, wherein the first chain links carry a plurality of first tools and the second chain links carry a plurality of second tools, the plurality of first and second tools being arrangeable in respective rows within the pressing zone.

4. The device according to claim 2, wherein the two chains are each provided so as to revolve about at least two wheels arranged at a distance from one another.

5. The device according to claim 2, wherein the guide is configured as two opposing rails, the first chain links or the at least one first tool being engaged with one rail, at least in the pressing zone, and the second chain links or the at least one second tool being engaged with the other rail, at least in the pressing zone.

6. The device according to claim 5, wherein the rails extend substantially parallel to one another, at least in part.

7. The device according to claim 5, wherein the rails extend towards one another in an entry region of the pressing zone and away from one another in an exit region of the pressing zone.

8. The device according to claim 5, wherein the shape of at least one of the rails can be changed by way of first adjustment means.

9. The device according to claim 8, wherein the at least one rail is configured so as to be able to bend in order to change its shape by way of the first adjustment means.

10. The device according to claim 4, wherein the wheels and/or first adjustment means associated with the first chain is/are attached to a first bearing structure, and/or the wheels and/or first adjustment means associated with the second chain is/are attached to a second bearing structure, the first and second bearing structures being able to move independently of one another by way of second adjustment means.

11. The device according to claim 10, wherein the first and/or second tool comprise on at least one side of the gap sealing means for tightly clamping together a first and second vacuum film which surround the deformed preliminary fabric, at least in part.

12. The device according to claim 11, wherein a suction portion is provided which comprises a housing with a gap for guiding through a portion of the first and second vacuum films therethrough, and a connection socket, to which a vacuum pump is connected.

13. The device according to claim 12, wherein the suction portion comprises in its interior and along the gap at least one face and a counter face, in particular a pressure roller and a counter pressure roller, between which the first and second vacuum films can be tightly clamped.

14. The device according to claim 13, wherein along the gap a plurality of faces and counter faces are provided which cooperate in pairs so as to tightly clamp the first and second vacuum films together, the pairs being distanced from one another along the gap in such a way that a ventilation portion formed between the first and second vacuum films may be arranged between two pairs when viewed transverse to the gap.

15. The device according to claim 12, wherein the suction portion comprises an inner matrix trap.

16. The device according to claim 1, wherein a heating device is provided which is arranged in the pressing zone, at least in part, and by means of which heat can be transferred to the consolidated deformed preliminary fabric for curing said deformed preliminary fabric so as to form a profiled part.

17. A method within the aeronautical and aerospace fields by way of a device according to claim 1, wherein rollers deform a preliminary fabric provided at a deformation zone of the device, wherein a first and second tool are guided in such a way that the tools press the preliminary fabric deformed in the deformation zone and arranged in a pressing zone of a device along a second axis as the deformed preliminary fabric moves along a first axis through the pressing zone, said second axis being substantially transverse to the first axis, so as to form a consolidated preliminary fabric, the first and second tools being guided substantially parallel to one another, in part, along the first axis in the pressing zone.

18. The method according to claim 17, wherein the deformed preliminary fabric is inserted between a first and second vacuum film before being conveyed to the pressing zone.

19. The method according to claim 18, wherein a vacuum is created in a space formed between the first and second vacuum films, either before the pressing zone or in the pressing zone.

20. The method according to claim 19, wherein ventilation material is provided between the first and second vacuum films at portions of the edge regions thereof relative to the first axis, the first and second vacuum films being guided through a suction portion either before or in the pressing zone, air being evacuated out of the space through the ventilation material, whilst regions of the first and second vacuum films arranged between the ventilation material are sealed in the suction portion during the evacuation process.

21. The method according to claim 17, wherein the deformed preliminary fabric configured as a dry fabric is impregnated with a matrix either before or in the pressing zone.

22. The method according to claim 17, wherein heat is transferred to the deformed preliminary fabric in the pressing zone in order to cure said preliminary fabric so as to form a profiled part.

23. The method according to claim 17, wherein the deformed preliminary fabric is conveyed to the pressing zone as continuous material and pressing is carried out in the pressing zone continuously.

* * * * *